(No Model.)
J. BROWN.
BICYCLE SHADE.
No. 582,170. Patented May 11, 1897.
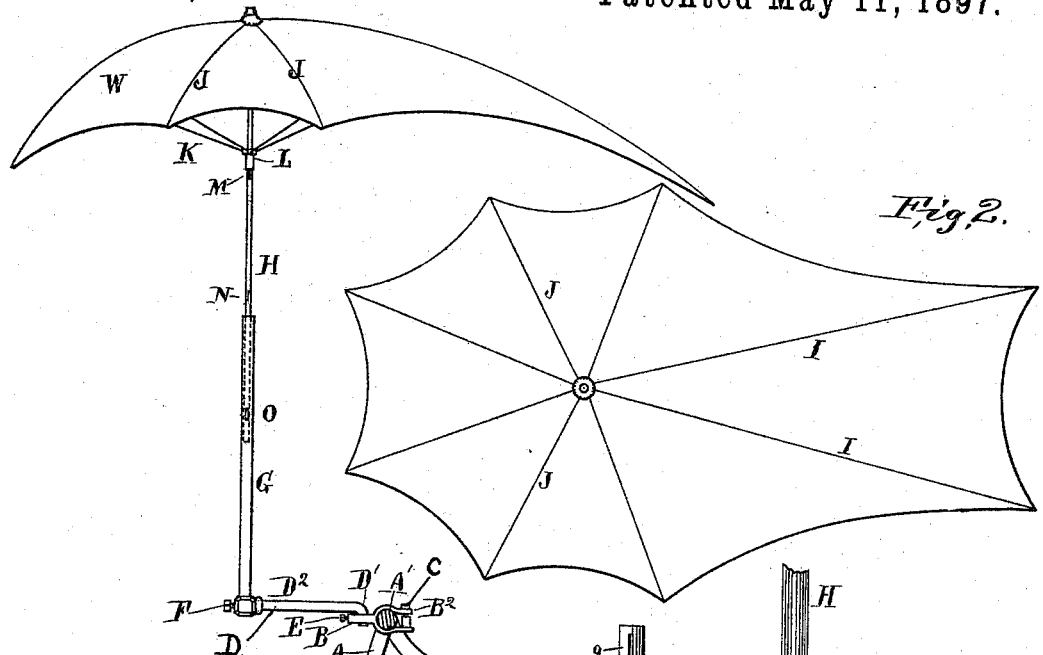

UNITED STATES PATENT OFFICE.

JAMES BROWN, OF NEW YORK, N. Y.

BICYCLE-SHADE.

SPECIFICATION forming part of Letters Patent No. 582,170, dated May 11, 1897.

Application filed June 17, 1895. Serial No. 553,056. (No model.)

*To all whom it may concern:*

Be it known that I, JAMES BROWN, of the city and county of New York, in the State of New York, have invented a certain new and useful Improvement in Bicycle-Shades, of which the following is a specification.

My improvements relate to the form of the shade and the means for supporting it upon the bicycle. I use the familiar and long-approved folding construction employed in umbrellas and parasols, making the braces of uniform length and the points of attachment of the braces to the ribs at uniform corresponding distances from the axis or pivot by which each is attached to the central rod, so that the shade will open and close as usual, and I make the length of the several ribs outside of the attachment of the braces of unequal length, short on each side, longer forward, and still longer rearward. This makes the shade when extended of so little width as to escape serious injury when the bicycle is by any chance upset, and yet gives efficient protection for the upper part of the person of the rider against sunshine or rain. I provide for giving a wide range of adjustment of positions of the shade, so that it may be adapted to winds in any required direction and in the absence of strong winds may defend against sunshine at widely-varying angles. The central rod may be set so as to be out of the way and give a clear space in which the rider may bow forward in the usual central position to any required extent and may vary the attitude within all the range ever required in the most dignified or most vigorous practice.

My invention is applicable to all styles of the safety-bicycle. Its introduction requires no changes in the construction of the ordinary parts.

The accompanying drawings form a part of this specification and represent what I consider the best means of carrying out the invention.

Figure 1 is a side elevation showing the new parts with so much of an ordinary bicycle as is necessary to indicate their relation thereto. Fig. 2 is a plan view. Figs. 3, 4, and 5 show details on a larger scale. Fig. 3 is a side elevation; Fig. 4, a plan view, and Fig. 5 a central vertical section. Fig. 6 is a side view corresponding to Fig. 1, showing a modification.

Similar letters of reference indicate corresponding parts in all the figures where they appear.

A is the nearly-upright shaft in the front portion of the steering-head of the ordinary bicycle of the style known as "safety," and A' is the ordinary handle-bar, rigidly fixed thereon in any ordinary or suitable manner.

B is a clamp having two pairs of jaws $B'\ B^2$ $B'\ B^2$, adapted to take firm hold of the handle-bar on each side of the shaft A by the aid of clamp-screws C, which allow it to be tilted forward and backward and adjusted firmly in any position. The body of the clamp has an upright cylindrical hole $b$, in which may be fitted the cylindrical pendent arm D' of an attachment D, the other arm $D^2$ of which extends out in any required direction, according as it is turned in the hole $b$, and is held firmly by a pinching-screw E. The arm $D^2$ carries at its outer end a boss having an upright hole $d$. A sleeve G, carrying the shade, is held stiffly in this hole by the aid of a pinching-screw F with capacity for being raised and lowered and turned partially. When the parts are adjusted for use, the sleeve G and also the smaller tubular rod H, fitted within it, and which serves as the central rod of the shade, are rigidly and strongly united to the shaft A and turn with it.

The shade, composed of silk W and an extensible frame, is carried on the rod H in the same manner as an ordinary shade or umbrella is supported on its central rod, but differs therefrom in having its ribs on the sides shorter than those at the front and rear. In case of accident the short side ribs are little liable to injury. I are long ribs which extend forward at the front and backward at the rear, the rearward ribs being longer than those at the front.

J are the ribs which are at the sides. There may be any ordinary or usual number of the ribs. I prefer eight—two long ones, extending forward; two longer ones, extending backward; two short ones, extending to the right, and two to the left.

The braces or stretchers K are all of uniform length and are attached at uniform distances from the pivots which attach the ribs to the rod. The lower ends of the stretchers K pivot to a runner L, which may be moved up and down on the rod H and is held up to keep the shade extended by a spring-catch M and is held down to keep the shade closed by a spring-catch N.

The rod H may be shifted up and down in the sleeve G and be retained at various elevations by means of a spring-catch O, which may engage in the several different slots $g$ in the sleeve, according as the rider may prefer to adjust it from time to time. All that is necessary to effect a change is to sufficiently force inward the catch O and move the rod H up or down. The slots $g$ are set staggered, so that a number may be made available, the rod H and its attached shade being turned a little to cause the position of the catch to coincide with the slot desired. When the right position is reached, the catch springs outward and engages the proper slot $g$ and holds it.

The sleeve G may be adjusted up and down in its support in the brace-arm $D^2$ with any degree of fineness by operating the screw F, and may be turned to the right and left to compensate for the partial revolving of the rod H in the sleeve G to match the slots.

The catch O should be adapted to resist displacement upward as well as downward, because upward strains are likely to be received when there is an upward action of wind.

It will be seen that by slackening the clamp-screws C the piece B and the connected shade may be inclined backward or forward and that by slackening the screw E the attachment D may be turned to the right or left, and by manipulating the screw F the shade may be raised and lowered, and by tightening the screws the whole will be rigidly set relatively to the shaft A and will turn with it freely. The raising and lowering by the aid of the catch O may be easily effected by one hand while the operator is riding and is guiding with the other. When the attachment D is turned hard to the right, the sleeve G and rod H are held so far to the right that the head of the rider when bowed forward may come in its usual central position and be out of contact therewith.

While the details of construction shown in the drawings are the ones I prefer, they may be subject to modifications which will not depart from the spirit of the invention and are intended to be included by the claim.

Thus I can increase or reduce the lengths of the parts, but I prefer the proportions shown for the reason, among others, that the parts may all be carried in a package or bag of moderate length.

I have in my experiments covered the ribs I J with brightly-colored silk W, and prefer such for the better class of shades, but the material and the hues may be varied within wide limits. It is essential that it be long for the front and rear ribs I and short for the side ribs J and that the several pieces be applied together and to the ribs, as shown.

Parts may be used without the whole. The hole $b$ in the clamp B is of the same size as the hole $d$ in the attachment D. I can, when required, at any time dispense temporarily or permanently with the attachment D and can insert and support the sleeve G directly in the hole $b$.

Instead of attaching the clamp B to the handle-bar A', I can, by an obvious change of the form, attach it by means of corresponding spring-jaws or otherwise to the nearly-upright sleeve of the steering-head, which forms the front of the main framing of the bicycle. Fig. 6 shows such a modification. Thus carried out the device could not be tilted forward and backward, but in all other respects this modification would serve the same as the form before described.

I claim as my invention—

In a bicycle canopy or shade a support adapted for attachment to the transverse handle-bar, consisting of a clamp device having a bifurcated portion that is adapted to engage and bind the transverse handle-bar and screw-fastening means for adjustably holding said clamp device in any desired angular relation thereto in a single vertical plane; a connecting supporting-arm pivotally sustained at one end to said clamp device and adapted to be adjusted laterally in relation thereto, and carrying at its opposite end a vertically-positioned sleeve, and which is provided with fastening means to allow of the vertical adjustment of said sleeve therein substantially as described.

In testimony that I claim the invention above set forth I affix my signature in presence of two witnesses.

JAMES BROWN.

Witnesses:
THOMAS DREW STETSON,
M. F. BOYLE.